(12) United States Patent
Ho

(10) Patent No.: US 8,123,243 B2
(45) Date of Patent: Feb. 28, 2012

(54) FOLDABLE BICYCLE

(76) Inventor: William M. Ho, Tigard, OR (US)

( * ) Notice: Subject to any disclaimer, the term of this patent is extended or adjusted under 35 U.S.C. 154(b) by 78 days.

(21) Appl. No.: 12/641,491

(22) Filed: Dec. 18, 2009

(65) Prior Publication Data

US 2011/0148069 A1 Jun. 23, 2011

(51) Int. Cl.
*B62K 3/00* (2006.01)
(52) U.S. Cl. ........................ 280/278; 280/287
(58) Field of Classification Search .................. 280/278, 280/287
See application file for complete search history.

(56) References Cited

U.S. PATENT DOCUMENTS

| | | | |
|---|---|---|---|
| 3,374,009 A * | 3/1968 | Jeunet | 280/287 |
| 4,022,485 A * | 5/1977 | Cox | 280/287 |
| 4,182,522 A | 1/1980 | Ritchie | |
| 4,460,191 A | 7/1984 | Ishibashi et al. | |
| 4,579,360 A | 4/1986 | Nishimura et al. | |
| 4,900,047 A | 2/1990 | Montague et al. | |
| 5,052,706 A | 10/1991 | Tsai et al. | |
| 5,125,678 A | 6/1992 | Bogen | |
| 5,398,955 A | 3/1995 | Yeh | |
| 5,794,958 A | 8/1998 | Hsiao | |
| 5,975,551 A | 11/1999 | Montague et al. | |
| 6,196,566 B1 | 3/2001 | Zhang | |
| 6,267,401 B1 | 7/2001 | De Jong | |
| 6,279,935 B1 * | 8/2001 | Wagner | 280/287 |
| 6,286,848 B1 * | 9/2001 | Augustin | 280/287 |
| 6,336,649 B1 | 1/2002 | Lin | |
| 6,364,335 B1 | 4/2002 | Mombelli | |
| 6,641,159 B1 | 11/2003 | Fan | |
| 6,880,848 B2 | 4/2005 | Liu | |
| 6,942,235 B2 | 9/2005 | Chang | |
| 6,979,013 B2 | 12/2005 | Chen | |
| 7,140,629 B2 | 11/2006 | Chen | |
| 7,159,884 B2 | 1/2007 | Gu | |
| 7,175,192 B1 | 2/2007 | Lu | |
| 7,198,281 B2 | 4/2007 | Huang | |
| 7,229,089 B2 | 6/2007 | Mihelic | |
| 7,243,936 B2 | 7/2007 | Huang | |
| 7,341,268 B2 | 3/2008 | Lin | |
| 7,367,576 B2 | 5/2008 | Pan | |
| 7,445,224 B2 | 11/2008 | Whyte | |
| 7,490,842 B1 | 2/2009 | Ulrich et al. | |
| 7,510,202 B1 | 3/2009 | Shiao | |
| 7,584,978 B2 | 9/2009 | Pourias | |
| 7,651,109 B2 * | 1/2010 | Tong | 280/278 |
| 2004/0032110 A1 * | 2/2004 | Bigot | 280/287 |
| 2007/0018421 A1 | 1/2007 | Chen | |
| 2007/0290479 A1 * | 12/2007 | Tong | 280/278 |

* cited by examiner

*Primary Examiner* — Joanne Silbermann
*Assistant Examiner* — Michael Stabley

(57) ABSTRACT

A foldable land vehicle employs two pivots: a first to rotate the rear-wheel assembly and shorten the distance between the chain-ring axle and the rear-wheel axle; and a second to rotate the chain-ring assembly and the rear-wheel assembly to align them with the main beam. The rear-wheel assembly detaches from the frame to enable rotation about the rear-wheel pivot. The rear-wheel pivot connects the chain-ring assembly to the rear-wheel assembly. The chain-ring pivot is preferably located on the main beam. Each pivot may be tilted from perpendicular to the approximate central vertical plane of the foldable land vehicle in order place the rear wheel and chain ring in a more compact state adjacent to the main beam.

7 Claims, 10 Drawing Sheets

FOLDABLE BICYCLE

TECHNICAL FIELD

In the field of land vehicles, a vehicle with a crank for pedaling is constructed in such a manner so as to allow the physical dimension of the vehicle to vary or change, the land vehicle being either solely occupant propelled as in a bicycle or having a motor supplementing the crank as in a motorbike.

BACKGROUND ART

Foldable bicycles are well known in the art, with perhaps the most notable performer in this regard being the folding bicycle sold under the trademark BROMPTON BICYCLE and described in U.S. Pat. No. 4,182,522. This prior art is referred to hereinafter as the "best prior art."

The best prior art has a rear wheel that folds down and forward around the rear-wheel pivot and the front part of the frame folds laterally on the hinge. Since the best prior art folds at two points, the bicycle achieves very small folded package. The package length is slightly longer than the wheel diameter plus the chain ring radius, which is the irreducible length of a folding bike.

However, since both the folded front and rear wheels are placed below the bike main tube, the height of the folding package is greater than an optimum length which is the wheel diameter. Furthermore, the bike hinge necessitates heavier tubing especially where the hinge is joined to the frame. A hinge also has greater manufacturing cost than that of a pivot and is less aesthetically appealing.

SUMMARY OF INVENTION

A foldable land vehicle employs a rear-wheel assembly that is rotatable about a rear-wheel pivot when a part of the rear-wheel assembly is disconnected from bicycle structure and a chain-ring assembly is rotatable about a chain-ring pivot. The chain-ring pivot also rotates the rear-wheel assembly. The rear-wheel pivot is preferably located on a chain stay that structurally connects the chain-ring assembly and the rear-wheel assembly. The chain-ring pivot is located on the bicycle frame or structure. Optionally, there is a detachable connection between the chain-ring assembly and the bicycle structure to enable rotation of the chain-ring assembly about the chain ring pivot. Optionally, there is a detachable connection between the rear-wheel assembly and either the chain-ring assembly or the front-frame assembly to enable rotation of the rear-wheel assembly about the rear-wheel pivot.

The rear-wheel pivot and the chain-ring pivot may each be slanted from perpendicular to a vertical plane of the foldable land vehicle to enable greater compaction in the folded state. Quick disconnects are preferred means for connecting and disconnecting the assemblies from the frame.

A suspension may be included at points in the land vehicle preferably to enable slight rotation about at least one of the pivots. In a preferred embodiment, the suspension is configured to enable the rear wheel to move up and down in the approximate vertical plane relative to the frame. The suspension is preferably between the seat base and either the chain-ring axle or the rear wheel axle.

Technical Problem

The best prior art uses a bike hinge at the main beam. The problem is lower weight and reduced complexity in the folding mechanism is needed.

The folded height of a land vehicle in the best prior art is larger than the wheel diameter. The problem is that a smaller folded height is needed.

A technical problem arises in a rear-wheel pivoting design in that the rear wheel rotation is limited by interference with the frame after rotation into a folded position. The main beam becomes a stop for rotation of the rear wheel.

If the rear-wheel pivot is offset from the perpendicular to the frame, then the rear wheel will rotate at an angle to the vertical plane defined by the frame, and this will permit the rear wheel to rise above the main beam. The problem is that the depth of the folded package then increases because the rear wheel rotates away from the frame.

A second problem occurs when a rear wheel is folded off the vertical plane in that the chain is likely to fall off because the chain ring and the sprocket are moved out of alignment in the vertical plane. The situation is worsened when in the folded position the distance between chain ring and sprocket is much shorter than in the unfolded position. This situation results from lot of chain slack and relatively large deviation from a single plane.

Solution to Problem

The solution to the problems is a folding mechanism based on vehicle component rotation about a plurality of fixed pivots. In the folded position, the distance between the chain-ring axle and the rear-wheel axle is reduced while at the same time, the chain or belt is maintained on the drive mechanism in a sturdy structure. The invention provides a means to rotate the folded rear-wheel assembly and the chain-ring assembly forward to fit between the longitudinal axis of the seat tube and the longitudinal axis of the steering column. One configuration using tilted pivots also delivers a smaller folded height when the wheels are brought up to the sides of the main tube.

The chain-ring pivot is preferably located above the chain ring and at its forward quadrant. When the chain-ring pivot is at this location, the structure defined by the shaft connecting the chain ring to the chain-ring pivot, together with the main tube of the frame and the seat tube, forms a rigid triangular structure that reinforces the highly stressed bottom bracket, which is the part of the frame around which the pedal cranks revolve.

Advantageous Effects of Invention

This invention enables a vehicle that rides well with full-size ride geometries and can be folded to a small compacted state with a minimum of additional weight for the folding mechanisms. The highly stressed bottom bracket on the land vehicle is braced with a rigid triangular truss, enabling a more durable land vehicle. A two point pivoting frame delivers a light weight, yet robust, structure with no hinges. It enables a land vehicle that is both easy to manufacture and low in manufacturing cost. The land vehicle is adaptable to wide variety of frame designs.

BRIEF DESCRIPTION OF DRAWINGS

The drawings show preferred embodiments of a foldable land vehicle comprising a bicycle and the reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
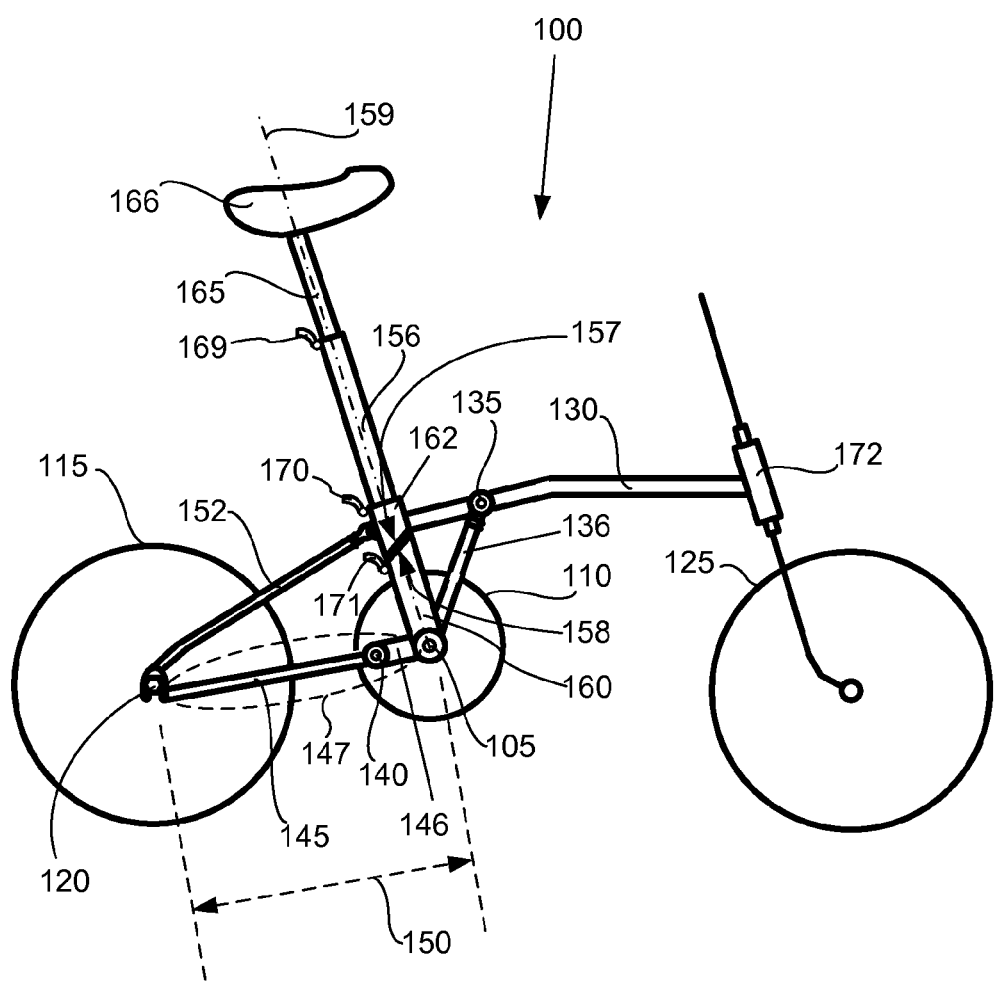
FIG. 1 is a side elevation view of a foldable bicycle.

A preferred embodiment of the invention is shown in FIG. 1. The preferred embodiment of the invention is a foldable land vehicle (100). Within the intended scope of the invention are powered vehicles that have a chain-ring axle for human pedaling, such as a motor bike. The term land vehicle is intended to be a generic term that encompasses both a human powered bicycle and a motor vehicle conforming to the limitations of the invention. For purposes of simplifying the description, the term bicycle is used herein interchangeably with the term land vehicle and is intended to encompass a land vehicle that is motor powered and human powered.

Figure 2:
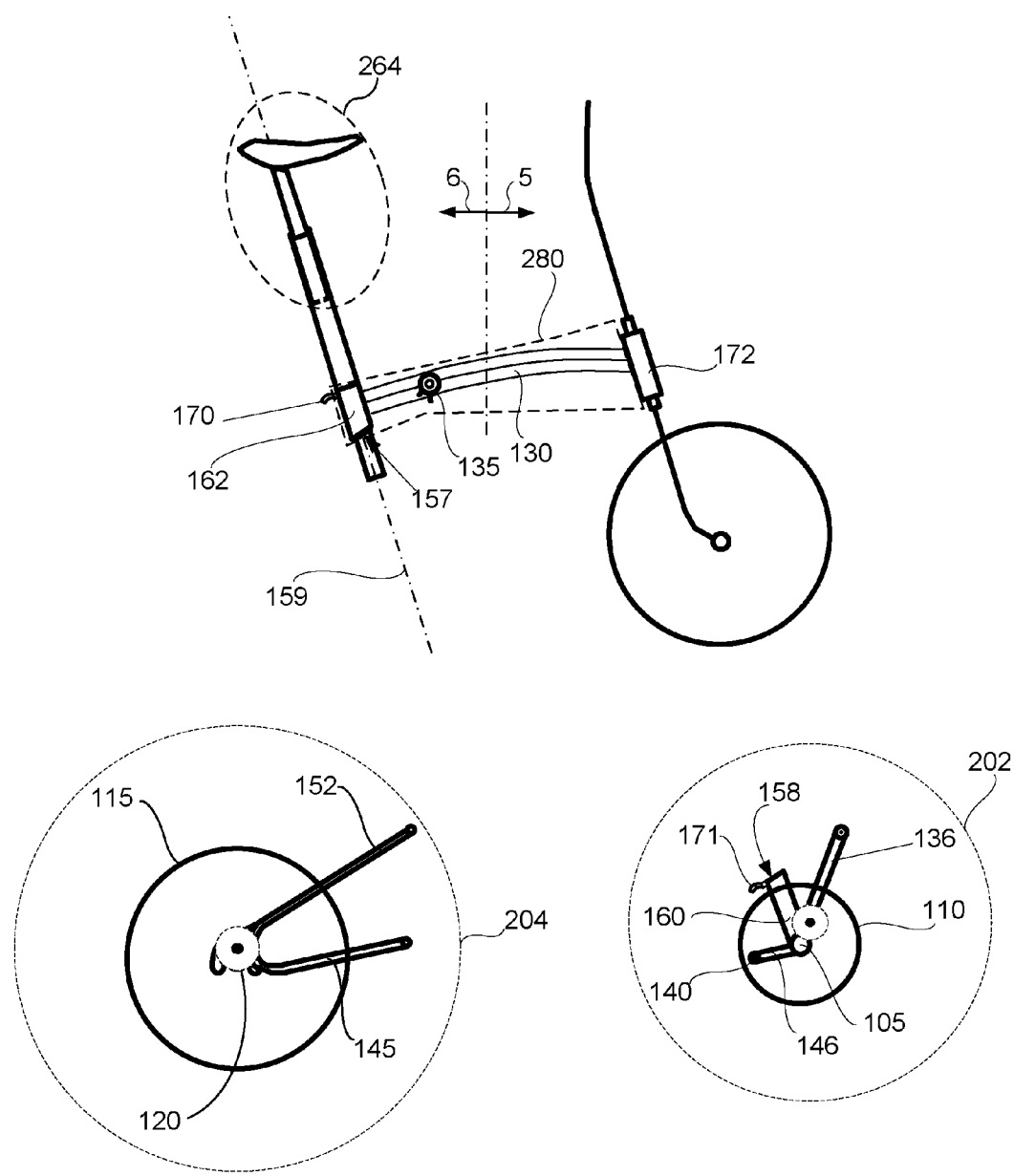
FIG. 2 is an elevation view of the separated assemblies of the foldable bicycle of FIG. 1.

Referring to FIG. 1 and FIG. 2, the foldable land vehicle (100) according to the invention has three major assemblies, each comprising the parts confined within the dashed circles: a front-frame assembly (280), a chain-ring assembly (202) and a rear-wheel assembly (204).

Figure 7:
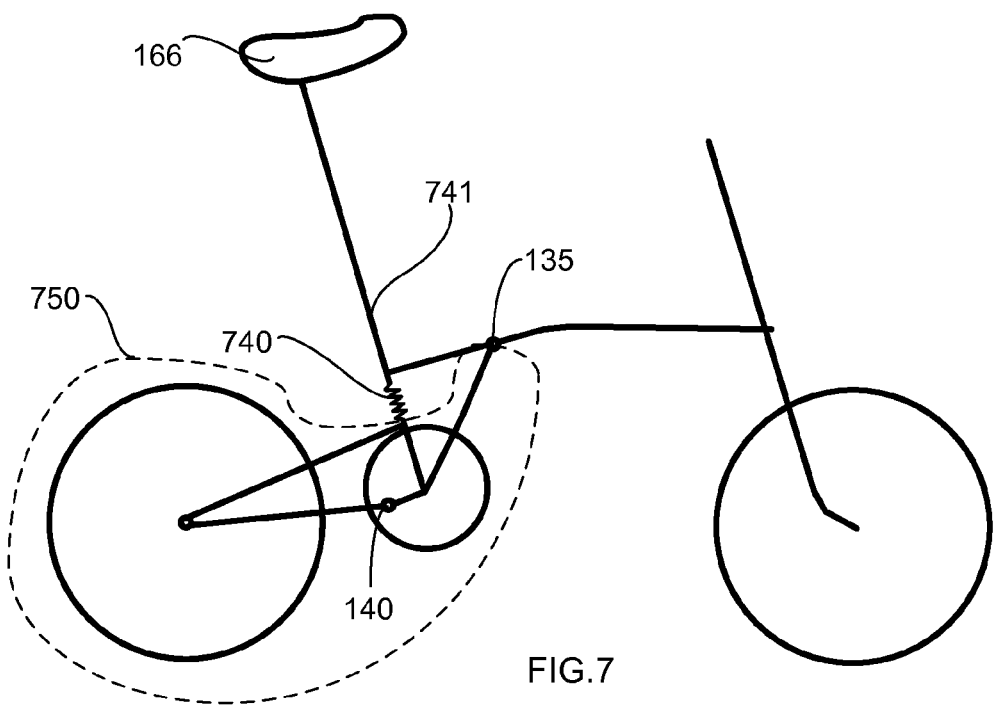
FIG. 7 shows an alternative spring-loaded suspension mechanism to suspend the rear-wheel assembly and the chain-ring assembly.

Referring to FIG. 1 and FIG. 7, a seat support structure (741), which preferably projects from the rearward section of the front-frame assembly (280) upward to the seat (166), is considered to be part of the front-frame assembly (280). In some embodiments, the seat support structure (741) comprises the seat base (162).

The chain-ring assembly (202) and the rear-wheel assembly (204) are each rotatably connected to the land vehicle (100) via a pivot, namely, a chain-ring pivot (135) and a rear-wheel pivot (140), respectively. When the land vehicle (100) is in the use configuration, the three major assemblies form a rigid structure after the chain-ring assembly (202) and the rear-wheel assembly (204) have been pivoted into position. In most embodiments of the invention, after having been pivoted into position these assemblies are rigidly secured via a connection spaced at a distance from its respective pivot. Thus, in these embodiments, each such assembly has two attachment points: one is at its pivot and the other at the connection to the land vehicle.

In these embodiments, each assembly connection is located at a distance from its respective pivot in order to secure the assembly to the foldable land vehicle and create a rigid structure. This connection may thereafter be unsecured to disconnect the assembly from the rigid structure.

The foldable land vehicle (100) has a forward region (5) and a rearward region (6), which are designated to aid in describing the use or operating configuration of the components of the invention. Consistently therewith, the term "rearward" refers to a direction towards rear wheel (115). The term "above" in respect to any component refers to a part of the component that is higher in height than a hypothetical horizontal line dividing the component in half when the component is on a bicycle that is ready to ride in its use condition or unfolded state.

FIG. 2 illustrates assemblies comprising the foldable land vehicle (100). The foldable land vehicle (100) includes a front-frame assembly (280); a chain-ring assembly (202); a chain-ring pivot (135); a rear-wheel pivot (140); and a rear-wheel assembly (204).

The front-frame assembly (280) comprises a main beam (130) extending in the forward region (5) and the rearward region (6) of the foldable land vehicle (100). In a preferred embodiment, the front-frame assembly (280) includes a seat support structure (741) connected to the rearward region (6) of the main beam (130). The front-frame assembly (280) may also include a head tube (172) and other frame parts that are unfoldably fixed to each other. The front-frame assembly (280) in these embodiments may be thought of as a structural skeleton, which is rigid and unfolding, for attaching the chain-ring assembly (202) and the rear-wheel assembly (204).

The chain-ring assembly (202) comprises a chain ring (110) mounted on a chain-ring axle (105), which is also commonly referred to as a crank axle. The chain ring (110) is typically used to connect a drive chain or a drive belt to a rear wheel sprocket.

The chain-ring pivot (135) is configured to structurally connect the chain-ring assembly (202) to the front-frame assembly (280), preferably to the main beam (130). The chain-ring pivot (135) is operable to rotate the chain-ring assembly (202) forward, that is, toward the forward region, when changing from the use configuration to the folded configuration.

A first means to enable such operability is by disconnecting the chain-ring assembly (202) from the front-frame assembly (280) using a detachable connection, such as the quick release (171) shown in FIG. 1 and also known as a quick disconnect. A detachable connection for the first means in whatever configuration is also referred to as a first connection to distinguish it from a detachable second connection between the rear-wheel assembly (204) and the foldable land vehicle.

Figure 9:
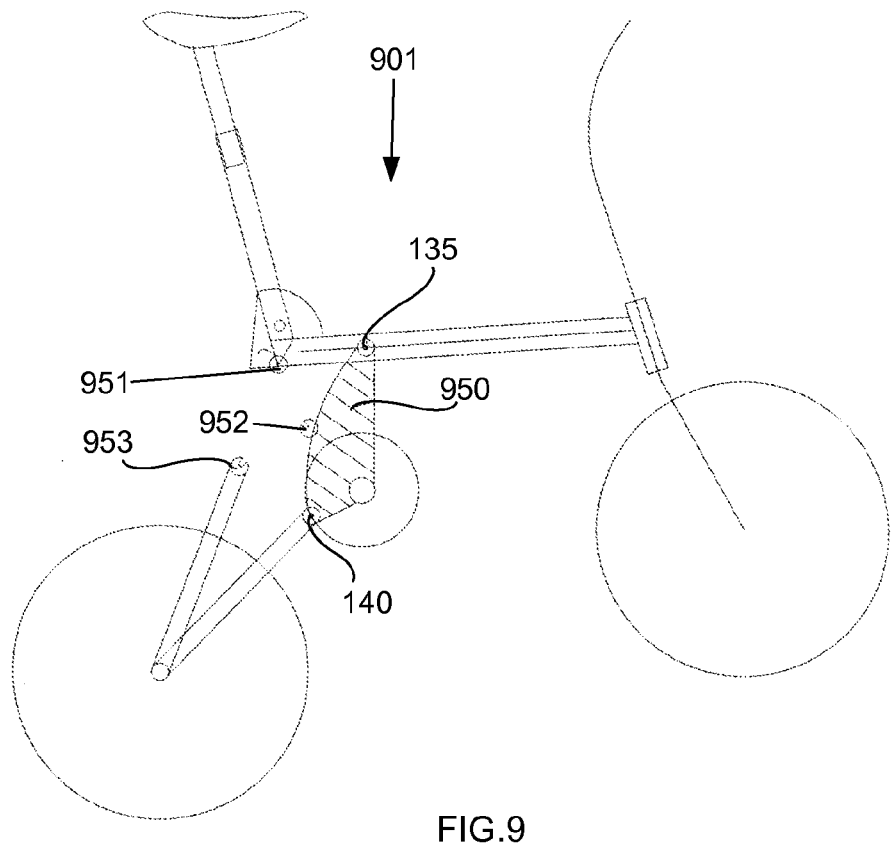
FIG. 9 is a side elevation view of a foldable bicycle showing a coinciding-attachment point for three assemblies configured to lock together using one quick disconnect.

An alternative configuration for said first means is shown in FIG. 9, embodiment (901), which uses a chain-ring support block (950) with three coincident disconnects that include: a folding-seat-tube disconnect (951), a chain-ring disconnect (952), a rear-wheel-assembly disconnect (953).

Figure 10A:
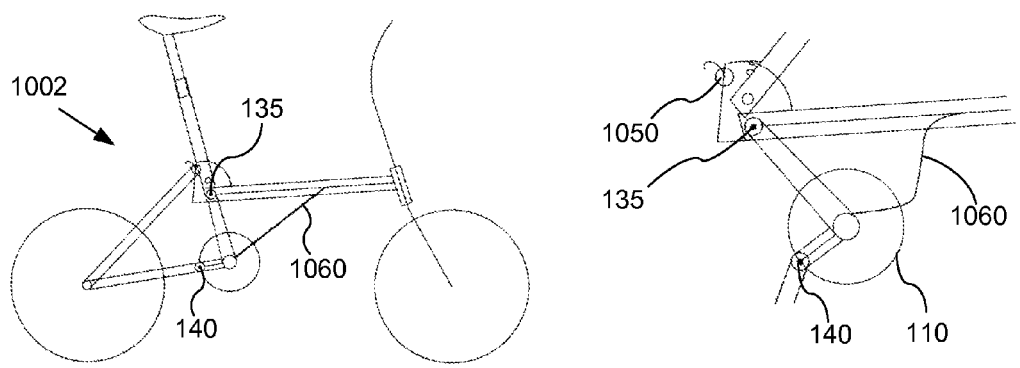
FIG. 10a is a side elevation view of a foldable bicycle illustrating a non-detachable connection between the main beam and the chain-ring assembly.

A second means to enable such operability is by employing flexible cable (1060), as shown in FIG. 10a at embodiment (1002) between the main beam (130) and the chain ring (110). This second means does not employ a detachable connection between the chain-ring assembly (202) and the main beam (130).

In embodiments not using a flexible cable (1060), such as is shown in FIG. 1, the chain-ring pivot (135) is connected to the chain ring (110) by a rod or rigid structural component, referred to herein as a shaft (136). Thus, the shaft (136) is configured to pivot about the chain-ring pivot (135) and since the opposite end of the shaft (136) is attached to the chain ring (110), the chain ring (110) also pivots about the chain-ring pivot (135).

In preferred embodiments, the connection between the chain-ring assembly (202) and the front-frame assembly (280) is located in the rearward region (6) on the main beam (130).

In FIG. 1, the chain stay (147), which is shown encompassed by the dashed oval, structurally connects the chain-ring axle (105) and the rear-wheel axle (120).

The rear-wheel pivot (140) is configured to structurally connect the chain-ring assembly (202) to the rear-wheel assembly (204). In preferred embodiments, the rear-wheel pivot (140) divides the chain stay (147) into two segments: a first segment (145) on rear-wheel assembly (204) and a second segment (146) on chain-ring assembly (202). Thus, the first segment (145) is from the rear-wheel axle (120) to the rear-wheel pivot (140); and the second segment (146) is from the chain-ring axle (105) to the rear-wheel pivot (140). With this pivot configuration, the rear-wheel assembly (204) folds by rotating first down and underneath the bottom bracket, then swinging up and forward to the main beam (130). In the process, the rear-wheel assembly (204) rotates about the rear-wheel pivot (140) through an arc of about 180 degrees.

The rear-wheel assembly (204) is configured to detachably connect to the foldable land vehicle (100) at a point separate from the rear wheel pivot (140). This detachable connection, which is also referred to herein as a detachable second connection, may be at any of the other assemblies of the foldable land vehicle (100), such as the front-frame assembly (280) and the chain-ring assembly (202). In other embodiments, the detachable connection may be at the seat support structure (741). A detachable seat stay (152) at the seat support structure (741) is an example of such a detachable connection.

The rear-wheel assembly (204) comprises a rear wheel (115) and a rear-wheel axle (120). The rear-wheel assembly (204) may also include the detachable seat stay (152), which in many embodiments connects the rear-wheel assembly (204) to the front-frame assembly (280), shown within the dotted shape in FIG. 2. The rear-wheel assembly (204) may also include the first segment (145). The rear wheel (115) is typically centered on the rear-wheel axle (120).

The distance between the chain-ring axle (105) and the rear-wheel axle (120) when the bicycle is in the use configuration is a first length (150). It is the first length (150) that is shortened when the bicycle (100) is in the folded position.

The rear-wheel assembly (204) is configured rotate around the rear wheel pivot (140) toward the forward region (5) when detached from the foldable land vehicle (100) when changing from the use configuration to the folded configuration.

A connection between any two components, including assemblies, in the context of the invention should be understood as any direct physical contact between the two assemblies, as in the case of a rigid connection, or as an indirect contact via a medium, as in the case of suspension connection where the medium is the suspension unit.

Figure 11:
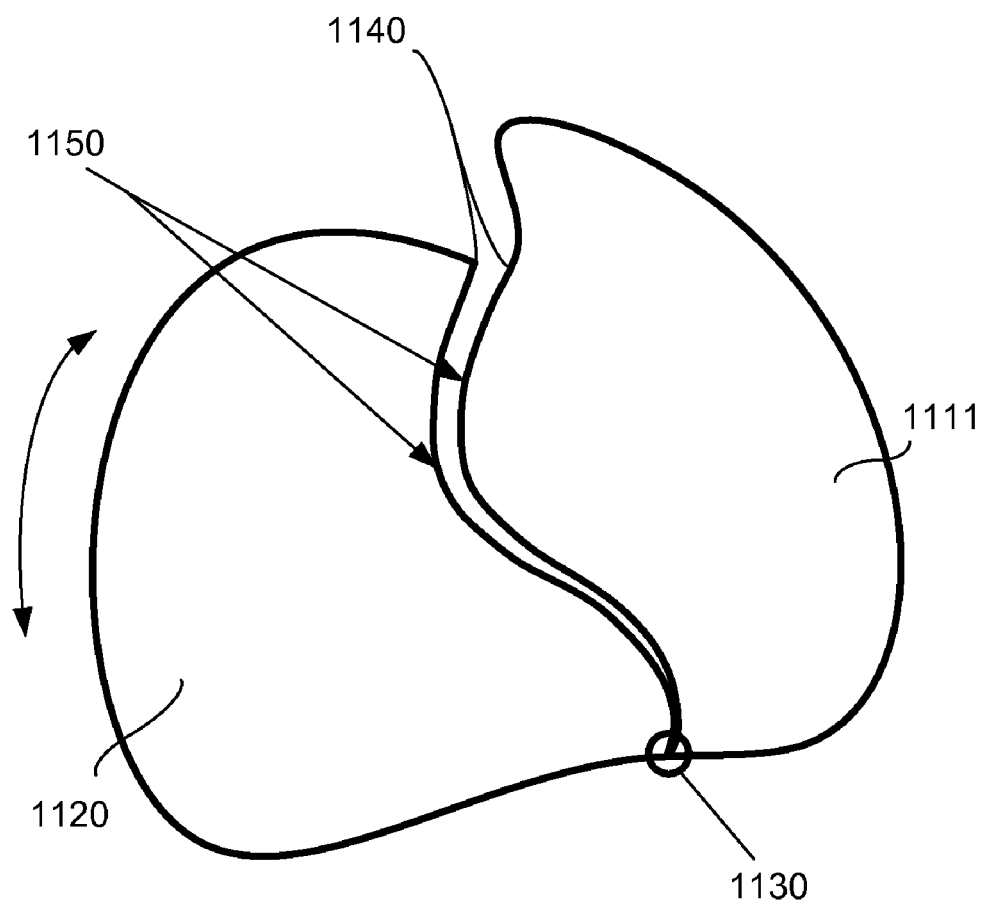
FIG. 11 is an illustration of pivoting assemblies having irregular shapes with adjoining faces and merging at a connection/disconnection point.

FIG. 11 is a figurative illustration of irregular-shaped pivoting assemblies with a direct connection. For example, a rear-wheel assembly (1120) and a chain-ring assembly (1111) having curved mating surfaces (1150). For this example, the rear-wheel pivot (1130) is at the bottom and it rotates the assemblies from connection/disconnection points (1140). For the rear-wheel assembly (1120) and a chain-ring assembly (1111) to form the most rigid structure, the connection/disconnection point (1140) and the rear-wheel pivot (1130) are preferably spaced apart as far apart as possible.

Figure 10B:
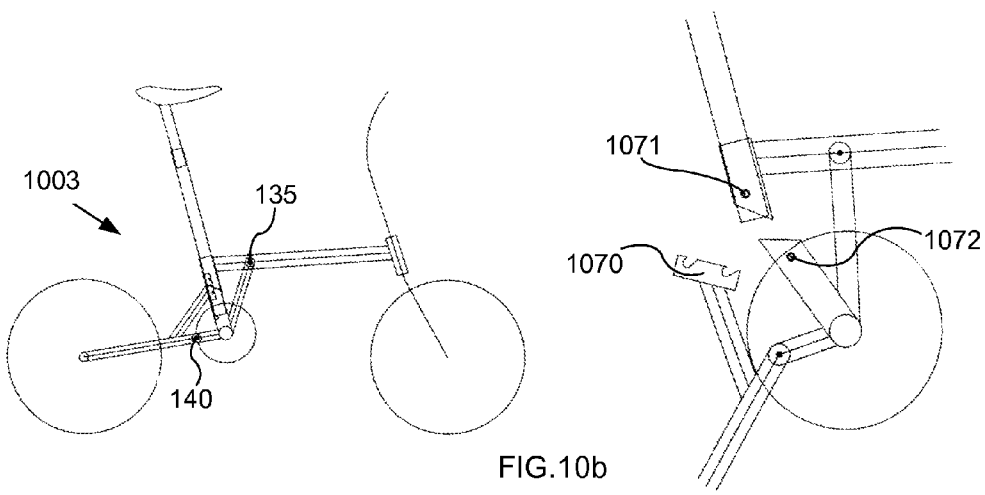
FIG. 10b is a side elevation view of a foldable bicycle illustrating assemblies that are interlocked into a rigid frame using a self-locking bracket when in a use configuration.

Other examples of a direct connection between the chain-ring assembly and the rear-wheel assembly are in FIG. 9, FIG. 10a, and FIG. 10b, where the preferred detachable connection is a quick release. These examples include the folding-seat-tube disconnect (951), the chain-ring disconnect (952) on chain-ring support block (950), the rear-wheel-assembly quick-disconnect (1050), and the combination self-locking bracket (1070) with an upper pin (1071) for the self-locking bracket and a lower pin (1072) for self-locking bracket.

Figure 6:
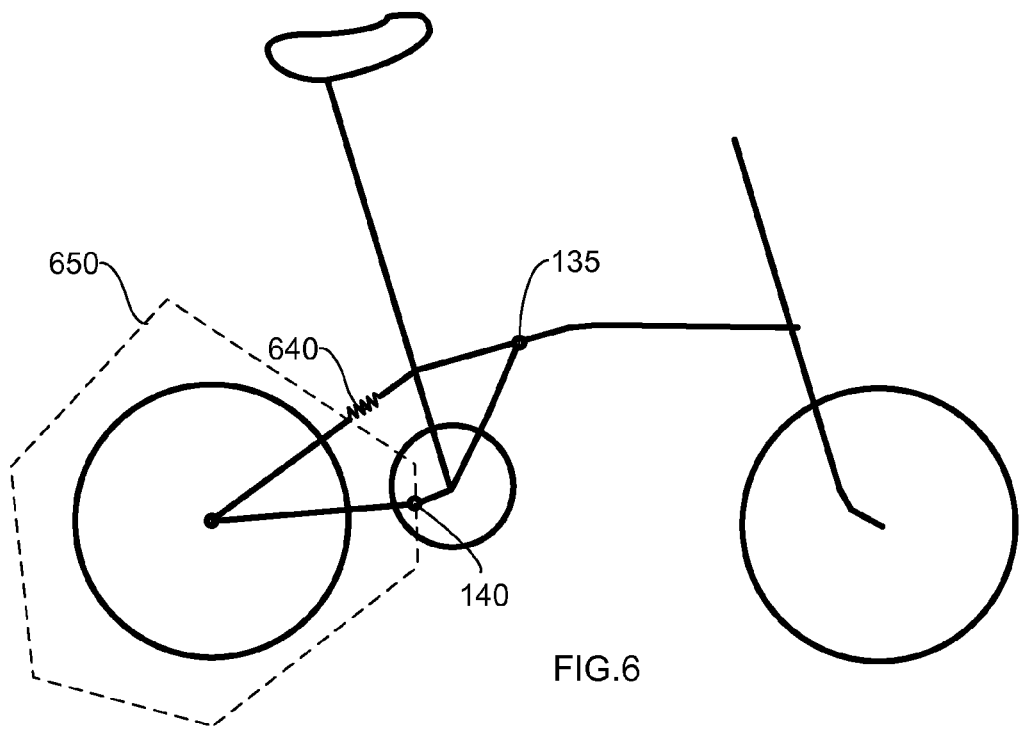
FIG. 6 shows an optional spring loaded suspension mechanism segmenting the seat stay.
Figure 8:
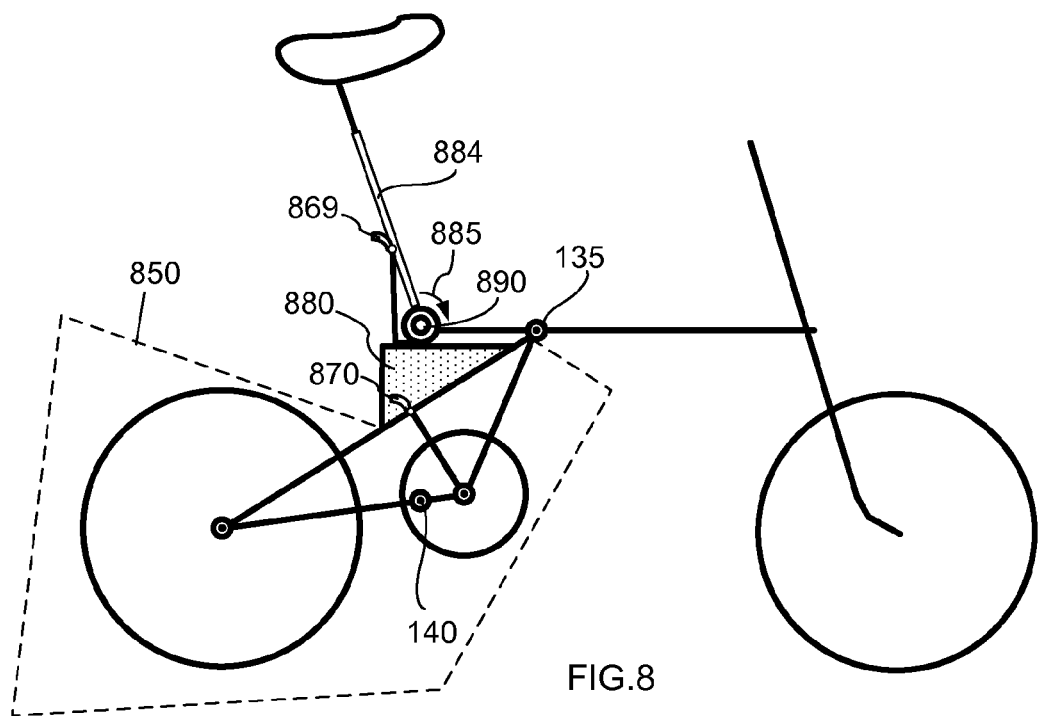
FIG. 8 is a side elevation view of a foldable bicycle showing a folding seat tube and a suspension block supporting the rear-wheel assembly

Examples of indirect connections are those: between the rear-wheel assembly (204) and the front-frame assembly (280) are in FIG. 6, at suspension 640); and, between the chain-ring assembly (202) and the front-frame assembly (280) in FIG. 7 at suspension (740) and in FIG. 8 at suspension block (880).

Each connection may be separate or combined with other connections. For example, in FIG. 9, there are three coincident connections that include: folding-seat-tube disconnect (951); chain-ring disconnect (952); and, rear-wheel-assembly disconnect (953). A desirable goal is to facilitate connection and disconnection of the bicycle's assemblies with a convenient single quick release. In case of FIG. 6 and FIG. 7, the opposing ends of the suspension, which are the suspension on seat stay (640) and suspension on the seat support structure (740), comprise a shock absorber, which in turn form a conventional linear type connection at the attachment points on the frame structure of the bicycle.

A connection between assemblies may also be made by mating the adjoining surfaces of assemblies. For example, FIG. 10b illustrates an embodiment (1003) employing a disconnect comprising a self-locking bracket (1070) engaging an upper pin (1071) extending from a structure connected to the front-frame assembly (280) and an lower pin (1072) extending from the chain-ring assembly (202). In this embodiment, the self-locking bracket (1070) further engages by the rider's weight sitting on the foldable land vehicle in the use configuration. Thus, with mating adjoining surfaces, the assemblies are connected together in the use configuration not with any single attachment point but with cooperating surfaces.

Preferably, detachable connections involved in the invention are provided by quick disconnects, which are well known in the art. Thus, it is preferable that the detachable seat stay (152) is detachable using a quick disconnect (170), which is configured to detach the detachable seat stay (152) from the front-frame assembly (280). FIG. 10a shows the detachable seat stay (152) detached from main beam (130). Any other type of mechanical connection that can be disconnected, such as with a wing nut and bolt, is also within the scope of the invention.

The main beam (130) and the rear wheel (115) are configured to define an approximate vertical plane of the foldable land vehicle (100), which is defined to help explain the pivoting or rotation of assemblies slightly offset from this approximate vertical plane. Such offset rotation enables the rotated assemblies to avoid interference with the front-frame assembly (280) and thus form a slightly wider but shorter and more compacted folded configuration.

The rear-wheel pivot (140) is operable to rotate the rear-wheel assembly (204) forward, that is, toward the forward region (5), upon detaching the detachable seat stay (152) from the seat base (162) when changing from the use or operating configuration to the folded configuration. Thus, in preferred embodiments, the rear-wheel pivot (140) is operable to rotate the rear-wheel assembly (204) forward upon detaching its connection to the front-frame assembly (280).

Figure 3:
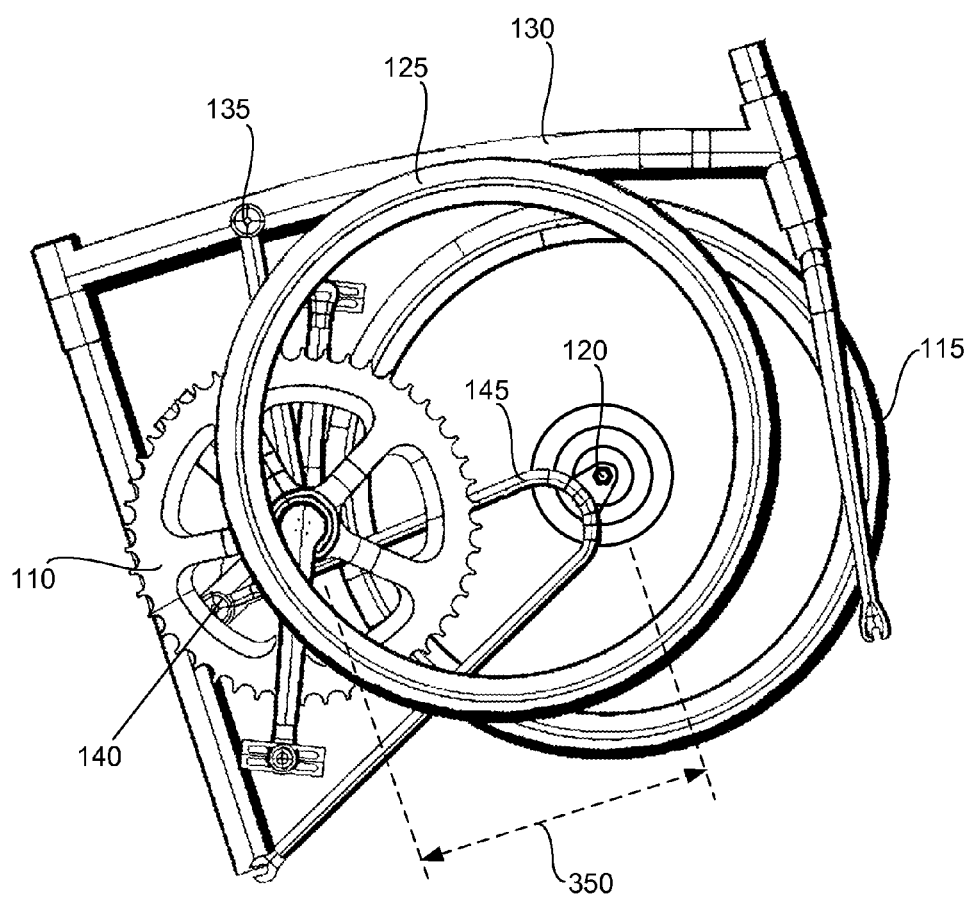
FIG. 3 is a side elevation view of a folded bicycle.

In reference to FIG. 3, both the chain-ring pivot (135) and the rear-wheel pivot (140) may be aligned so that each rotational axis is normal or perpendicular to the approximate central vertical plane of the bicycle (100). With this alignment, the main beam (130) can be a limiting stop to the rotation of the rear wheel (115).

Figure 5:
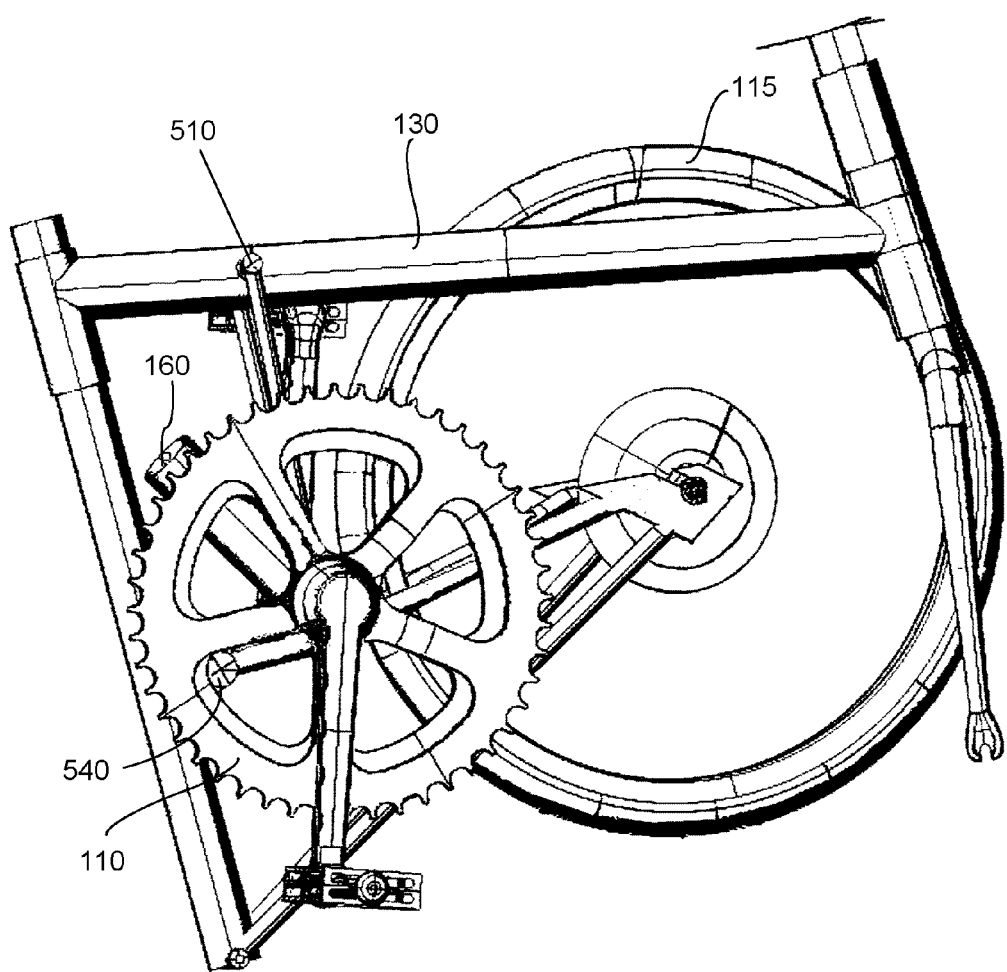
FIG. 5 is a side elevation view of a folded bicycle employing pivots that are off-perpendicular to a plane of the vehicle.

FIG. 5 illustrates off-normal alignment of the rotational axes of the pivots. An off-normal chain-ring pivot (510) and an off-normal rear-wheel pivot (540) are installed slightly askew from perpendicular to the main beam (130), and are thus configured to rotate the rear wheel (115) away from the approximate vertical plane of the foldable land vehicle (100) when changing from the use configuration to the folded configuration. This avoids the limiting stop to the rotation of the rear wheel (115) provided by the main beam (130) and gains additional-length compaction in the folded configuration.

The foldable land vehicle (100) may employ a suspension that exploits the presence of the pivots (135 and 140) in that it enables parts to yield to bumps encountered while riding by rotating about one or both of the pivots resisted by a spring or spring-like material. Spring-loaded suspension mechanisms are well known in the art. In some embodiments, the assembly connections to the main beam (130) may themselves comprise the suspension (640), as further illustrated in FIG. 12d and e. As indicated above, such connections are configured to enable the chain-ring assembly (202) and the rear-wheel assembly (204) to move up and down in the approximate vertical plane relative to the front-frame assembly (280).

More specifically, FIGS. 6, 7 and 8 show preferred embodiments comprising the suspension (640) and (740) and suspension block (880). In its simplest description, the suspension is attached at one end to a component rigidly connected to the main beam (130), and at an opposite other end at a structural point comprising one of three preferred locations.

The first preferred location, as illustrated in FIG. 6, is on the rear-wheel assembly (204) configured to enable rotation of the rear wheel (115) about the rear-wheel pivot (140) as the suspension (640) is working. As shown, the detachable seat stay (152) comprises the suspension (640). Essentially, the suspension (640) makes most of the rear-wheel assembly (204), which are the components shown within the first perimeter box (650), into a suspended structure relative to the remaining rigid structure of the land vehicle. The suspension (640) enables the components within first perimeter box (650) to pivot about the rear wheel pivot (140) in response to bumps in the road.

The second preferred location, as illustrated in FIG. 8, is on the rear-wheel assembly (204) and configured to enable rotation of the rear wheel (115) about the chain-ring pivot (135) as the suspension, that is the suspension block (880), is working. Essentially, the suspension block (880) makes the rear-wheel assembly (204) and the chain-ring assembly (202), which are the components shown within the third perimeter box (850), into a suspended structure relative to the remaining rigid structure of the land vehicle. In the use or riding configuration, the quick release (870) locks the chain-ring assembly (202) and the rear-wheel assembly (204) into one rigid structure. The hypotenuse side of suspension block (880) is partially supported on the rear-wheel assembly (204). The suspension enables rotation of the rear wheel (115) about the chain-ring pivot (135).

The third preferred location, as is illustrated in FIG. 7, is on the chain ring assembly (202) and configured to enable rotation of the rear wheel (115) about the chain-ring pivot (135) as the suspension (740) is working. The suspension (740) is part of the seat support structure (741). The suspension (740) makes both the rear-wheel assembly (204) and the chain-ring assembly (202), which are the components within the second perimeter box (750), into a suspended structure relative to the remaining rigid structure of the land vehicle. The suspension (740) enables the components within the second perimeter box (750) to pivot about the chain-ring pivot (135) in response to bumps in the road.

Figure 12:
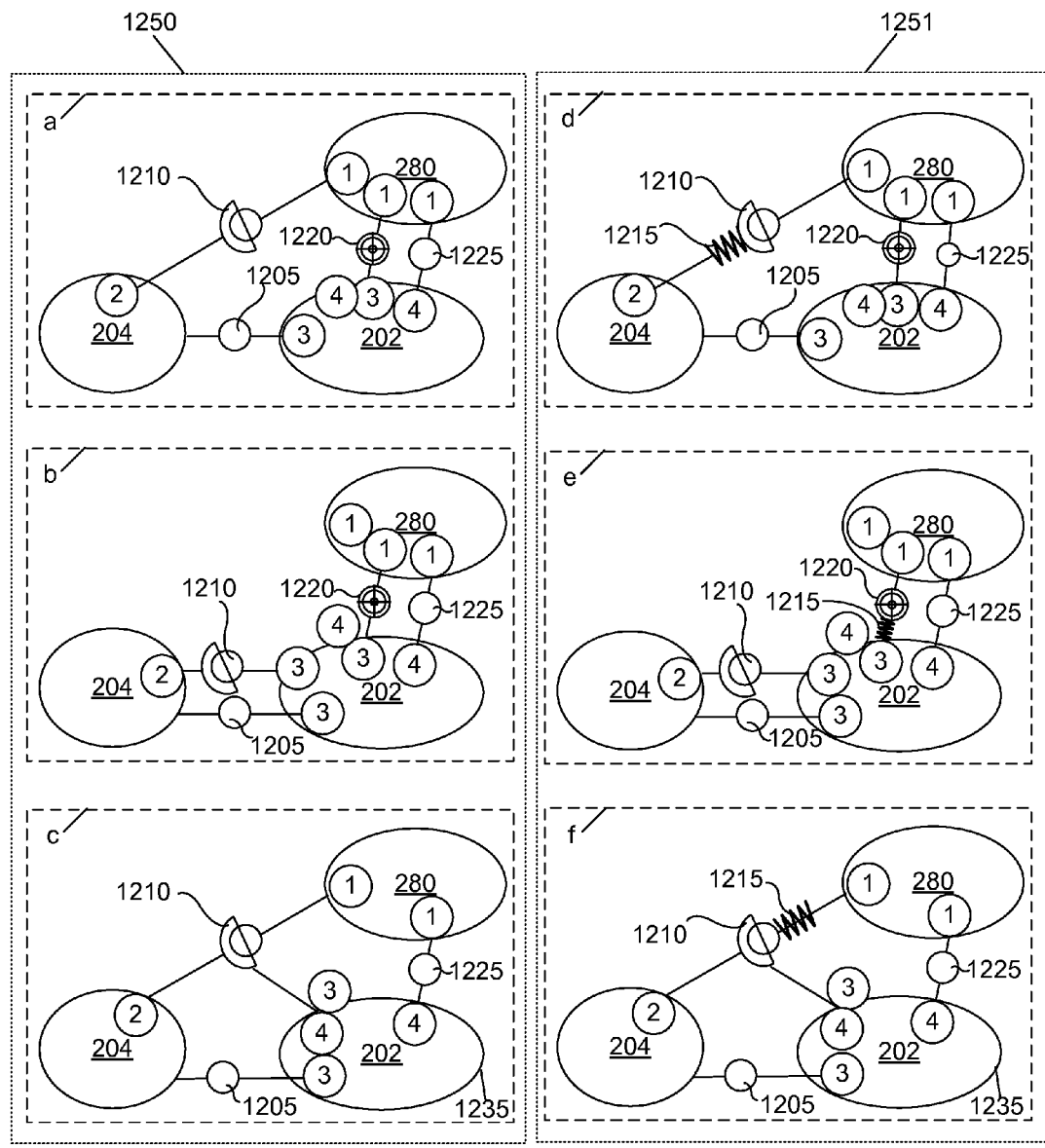
FIG. 12 is a diagram of the variety of locations where the pivots and the disconnects may be located.

Numerous bicycle frame configurations are possible using the pivots of the invention. FIG. 12 is a representation of the six configurations, denoted in the dashed boxes labeled a-f, showing the potential locations for the rear-wheel pivot (1205) and the chain-ring pivot (1225) in the figurative context of the chain-ring assembly (202), the rear-wheel assembly (204) and the front-frame assembly (280), figuratively represented as the ovals. The left column (1250) shows rigid frame embodiments without a suspension. The right column (1251) shows embodiments with suspensions.

In FIG. 12, any line connecting two ovals denotes a connection between assemblies. The symbols shown on the lines indicate the type of connection, namely a detachable connection (1210), a suspension (1215); or a detachable or non-detachable connection (1220).

In FIG. 12, the preferable locations of general attachment points for the connections are indicated by circled numbers: Circle 1 denotes the rearward region, preferably near the rearward end of the main beam (130). Circle 2 denotes any part of the rear-wheel assembly (204). Circle 3 denotes rearward of the chain-ring axle (105). Circle 4 denotes above the chain-ring axle (105).

The suspension (1215) may be mounted above or below or at a connection depending on a particular design. Therefore, its location in FIG. 12 conveys no significance as to its relative location in the foldable land vehicle.

As can be seen with reference to FIG. 12a and f, the detachable connection (1210) may be located between the rear-wheel assembly (204) and either the chain-ring assembly (202) or the front-frame assembly (280). The connection between the front-frame assembly (280) and the chain-ring assembly (202) may be a detachable or non-detachable connection (1220). A detachable connection (1210), shown in FIG. 12b, between the rear-wheel assembly (204) and the chain-ring assembly (202) is configured to enable rotation of the rear-wheel assembly (204) about the rear-wheel pivot (140) when the detachable connection is detached.

For example, the foldable bicycles shown in FIG. 1 and FIG. 10a corresponds to the type shown in FIG. 12a; the bicycle shown in FIG. 6 corresponds to the type shown in FIG. 12d; the bicycle shown in FIG. 7 and FIG. 8 corresponds to the type shown in FIG. 12e; and, the bicycles shown in FIG. 9, FIG. 10b correspond to the type shown in FIG. 12c.

For preferred embodiments in the folded configuration, the distance between the chain-ring axle (105) and the rear-wheel axle (120) is shorter than the first length (150). This shortened distance, or second length (350), is shown in FIG. 3. The rear-wheel pivot (140) is preferably located on the chain stay (147) at a location such that, in folded configuration, the rear wheel (115) is touching the structure supporting the chain-ring axle (105) and the second length (350) between the chain-ring axle (105) and rear-wheel axle (120) is the shortest possible distance.

If the rear-wheel pivot (140) were located too close to the chain-ring axle (105), then there would be a gap between the rear wheel (115) and the structure supporting the chain-ring axle (105) and this would not be the shortest possible distance between the chain-ring axle (105) and rear-wheel axle (120). Thus, it would not be the preferable location for the rear-wheel pivot (140).

On the other hand, if the rear-wheel pivot (140) were too far from the chain-ring axle (105), then the rear wheel (115) would intersect the structure supporting the chain-ring axle (105) too soon, and as a result would again prevent the rear wheel (115) from fully rotating into the shortest possible distance between the chain-ring axle (105) and rear-wheel axle (120). In practice, the optimal rear-wheel pivot position is influenced by factors that depend on the specific bicycle dimensions and components. While the rear-wheel pivot (140) should be located to help achieve the goal of reducing the length of the folded configuration, its location should not interfere with the folding and unfolding operations. Another influencing factor is accommodating the bicycle wheel size.

Figure 4:
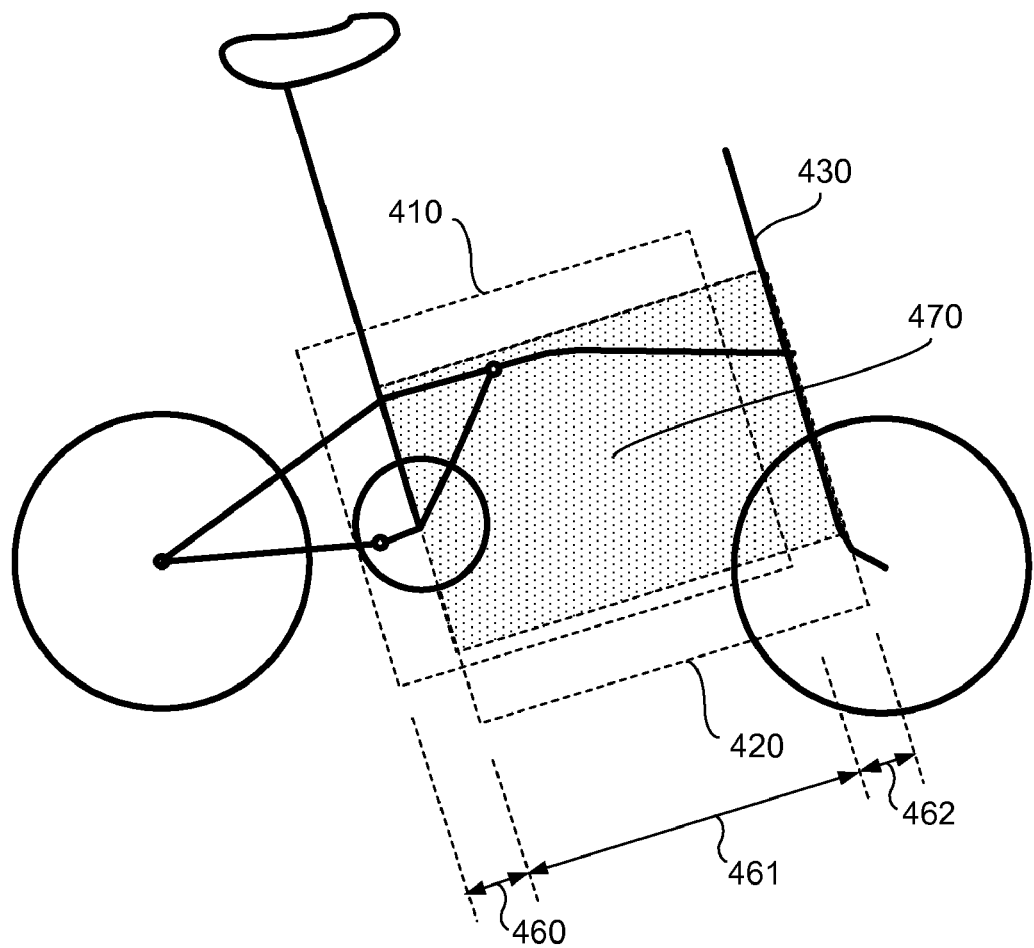
FIG. 4 is a side elevation view of a foldable bicycle showing the profile of the area occupied by the folded bicycle according to the invention.

Referring to FIG. 4, the shortest possible distance between the chain-ring axle (105) and rear-wheel axle (120) occurs when a first distance (460) plus a second distance (461) is the shortest possible and is approximately equal to the length of the frame (130) defined by a third distance (462) plus the second distance (461). The first distance (460) measures approximately the chain-ring radius and the third distance (462) is the distance between the hinge of the best prior art and the head tube (430). In this case, pivoting the chain ring (110) forward shifts and aligns the rear wheel (115) and the chain ring (110) along the frame (130) with no part sticking out beyond the frame (130) extremities.

The chain-ring pivot (135) is preferably located above the chain ring (110) on the main beam (130) at a vertical position forward of the chain-ring axle (105), that is, closer the front wheel (125) from the perspective of the chain-ring axle (105). Shaft (136) together with the main beam (130) and the inner seat tube (156) and lower seat tube (160) forms a triangular structure. Thus, reinforcing the bicycle structure.

A preferred embodiment of the foldable land vehicle (100) includes an inner seat tube (156) configured to slidably receive a seat assembly (264) and lock the seat assembly (264) in place. Preferably, a first quick release (169) on the inner seat tube (156) locks the seat shaft (165) to a fixed position within the inner seat tube (156).

The inner seat tube (156) slides within a seat base (162) that is fixed to the main beam (130). The inner seat tube (156) is preferably configured to slide up and down through the seat base (162) to facilitate compaction of the bicycle (100) in the folded position. A second quick release (170) connection on the seat base (162) is preferred to enable locking the inner seat tube (156) into a fixed position. A second function of the second quick release (170) is to secure the connection of the upper end of the detachable seat stay (152) with the seat base (162) when the bicycle is in the use configuration, and to release the connection of the upper end of the detachable seat stay (152) with the seat base (162) when the bicycle is to be folded. A seat stay is common to most bicycles and typically comprises thin frame tubes that run from the ends of the rear-wheel axle up to a seat assembly.

This embodiment also includes lower seat tube (160) attached to the chain-ring axle (105) and configured to slidably receive the inner seat tube (156), to be separable from inner seat tube (156) in order to enable rotation of the chain ring about the chain-ring pivot. Preferably, a third quick release (171) on the lower seat tube (160) tightens against the inner seat tube (156) to lock it in place. Separation of the lower seat tube (160) from the inner seat tube (156) enables chain ring (110) rotation about the chain-ring pivot (135).

An alternative embodiment of the bicycle includes a seat base (162), which has a top end and a bottom end (157). The seat base (162) is preferably configured to detachably connect to a lower seat tube (160) at the bottom end of the seat base (162). In this embodiment, the lower seat tube (160) is attached to the chain-ring axle (105) and is configured to enable rotation of the chain ring (110) about the chain-ring pivot (135) when detached from the seat base (162).

Preferably, the seat base (162) and the lower seat tube (160) are aligned along a longitudinal axis (159). The bottom end (157) of seat base (162) is not normal to the longitudinal axis (159). The lower seat tube (160) comprises a top end (158) that is not normal to the longitudinal axis (159) and that adjoins with the bottom end (157) of the seat base (162).

In an alternative embodiment, the inner seat tube (156), the seat base (162) and the lower seat tube (160) are ovate, that is not round in cross section. Preferably, these are aero-shaped to guide sliding of the inner seat tube in a fixed alignment and to present a stream lined projection while riding.

Preferably, when the foldable bicycle is in a riding or use configuration, the seat base (162) and the lower seat tube (160) are united to effectively form a single tube. The inner seat tube (156) is inserted through seat base (162), and then partially inserted in the lower seat tube (160), coming to rest against a stopping ring or other device within the lower seat tube (160). Quick releases (170, 171) may then be engaged to tighten seat base (162) and the lower seat tube (160) against inner seat tube (156). The quick release (170) may then be engaged to secure the upper end of the detachable seat stay (152) to the seat base (162). Thus a triangular, rigid structure is formed.

In an alternative embodiment of the bicycle, seat base (162) and lower seat tube (160) couples directly. A single rigid tube is thus formed without the need of their couplings to an inner seat tube (156).

Preferably, folding a bicycle involves a process of disengaging the quick releases and pivoting the rear wheel (115) and chain ring (110). Quick release (170) disengages the inner seat tube (156) from the seat base (162). Quick release (171) disengages the lower seat tube (160) from the inner seat tube (156). Then, the inner seat tube (156) may be pulled up to clear the top of lower seat tube (160). Preferably, a knob at the lower end of the inner seat tube (156) automatically engages with an opening on seat tube (162) to prevent the inner seat tube (156) from being completely withdrawn from the seat base (162). Then, further lifting of the inner seat tube (156), causes the rear wheel (115) and chain ring (110) to rotate forward.

The bicycle optionally includes a chain tensioner, which is used as a device to restraint the chain from falling off while the bike is folded. The axis of the chain-ring pivot (510) preferably has a larger offset from perpendicular than the axis at rear-wheel pivot (540). This configuration keeps a rotational plane defined by rotation of the rear wheel (115) coincident with the plane defined by the chain ring (110), and this tends to minimize the possibility of the chain jumping off the chain ring (110) or the rear wheel sprocket. It is advantageous at times to offset both pivots in combination so that the rear wheel (115) folds to a position close to the main beam (130).

The minimum length of the folded bicycle shown in FIG. 1 is defined by the lines projected from the seat base (162) and from a head tube (172). The minimum height is essentially defined by the height of the rear wheel (115), which can be more easily seen in FIG. 5.

FIG. 3 and FIG. 5 show two embodiments in the folded configuration and FIG. 4 shows three rectangular areas within which a bicycle can be folded. Prior art rectangular area (410) is one of the best performers in the prior art. Rectangular area (420) shows the minimum possible length and height of an embodiment of the present invention exemplified by the folded bicycle shown in FIG. 3, that is one in which the chain-ring pivot (135) and the rear-wheel pivot (140) are normal to the approximate central vertical plane. As can be easily seen from FIG. 4, both areas (410) and (420) are approximately the same.

Rectangular area (470) shows the minimum possible length and height of an alternative embodiment of the present invention exemplified by the folded bicycle shown in FIG. 5, which is the one in which the chain-ring pivot (510) and the rear-wheel pivot (540) are off normal to the approximate central vertical plane. As can be easily seen from FIG. 4, rectangular area (470), represented by the shaded area in FIG. 4, is smaller than the prior art rectangular area (410) and is thus a further reduction in height when compared to one of the best performers in the prior art.

The shortest possible distance between the crank axle (105) and rear-wheel axle (120) occurs when a first distance (460) plus a second distance (461) is the shortest possible and is approximately equal to the length of the main beam (130) defined by a third distance (462) plus the second distance (461). In this case, pivoting the chain ring (110) forward shifts and aligns the rear wheel (115) and the chain ring (110) along the main beam (130) with no part sticking out beyond the frame (130) extremities.

The present invention may be equipped with other well known features, which are listed herein to show that such features are in the prior art or would be obvious additions to the present invention. These features include: a quick release on the front wheel; a cable, or other limiting mechanism, to limit the extent the rotation of either the rear wheel (115) or the chain ring (110); a seat tube foldable forward to lay approximately parallel to the main beam instead of sliding seat tube; foldable front fork/wheel and foldable handle bar riser to complete the folding quickly without a tool.

FIG. 8 shows an embodiment with a quick release (869) for folding seat, a quick release (870) for chain-ring assembly (202), a suspension block (880), a folding seat tube (884) with the arrow (885) showing seat tube rotation, and a seat tube pivot (890) for seat tube rotation.

The invention is operable for a bicycle or motor bike using any wheel size. The most functional implementation is thought to be for smaller wheeled bicycles, for example with 17-inch diameter wheels. Larger or smaller diameter wheels with a proportional frame would accommodate different-size riders.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the bicycle industry.

What is claimed is:

1. A land vehicle compactable into a folded position from an operating condition, the land vehicle comprising:
a main beam;
a chain-ring assembly comprising a chain ring mounted on a chain-ring axle wherein the chain-ring assembly is connected to the main beam by a first connection that is detachable;
a chain-ring pivot structurally connecting the chain-ring assembly to the main beam and operable to rotate the chain-ring assembly forward upon detaching the first connection to the main beam;
a chain stay structurally connecting the chain-ring axle and a rear-wheel axle;
a rear-wheel pivot dividing the chain stay into two segments, a first segment from the rear-wheel axle to the rear-wheel pivot and a second segment from the chain-ring axle to the rear-wheel pivot;
a rear-wheel assembly comprising: a rear wheel; the rear-wheel axle; and the first segment, wherein the rear-wheel assembly is connected to a structural point positioned along a section of the land vehicle selected from the group consisting of: the main beam and the chain-ring assembly by a detachable second connection; and,
wherein the rear-wheel pivot is operable to rotate the rear-wheel assembly forward upon detaching the detachable second connection from the structural point positioned along a section of the land vehicle selected from the group consisting of: the main beam and the chain-ring assembly.

2. The land vehicle of claim 1 wherein the rear-wheel pivot is configured to rotate the rear wheel away from the approximate central vertical plane of the land vehicle.

3. The land vehicle of claim 1 wherein the chain-ring pivot is configured to rotate the chain ring away from the approximate central vertical plane of the land vehicle.

4. The land vehicle of claim 1 further comprising:
a seat base comprising a top end and a bottom end and configured to detachably connect to a lower seat tube at the bottom end;
wherein the lower seat tube is attached to the chain-ring axle and configured to enable rotation of the chain ring about the chain-ring pivot when detached from the seat base.

5. The land vehicle of claim 4:
wherein the seat base and the lower seat tube are aligned along a longitudinal axis;
wherein the bottom end of seat base is not normal to the longitudinal axis;
wherein the lower seat tube comprises a top end that is not normal to the longitudinal axis and that adjoins with the bottom end of the seat base.

6. The land vehicle of claim 1, further comprising:
an inner seat tube configured to slidably receive a seat assembly and lock the seat assembly in place;
a seat base fixed to the main beam and configured to slidably receive the inner seat tube and lock the inner seat tube in place; and,
a lower seat tube attached to the chain-ring axle and configured to:
slidably receive the inner seat tube, and,
be separable from inner seat tube in order to enable rotation of the chain ring about the chain-ring pivot.

7. The land vehicle of claim 1 further comprising a suspension attached at one end to component that is rigidly connected to the main beam, and supported at an opposite end at a structural point on the land vehicle selected from the group consisting of:

on the rear-wheel assembly configured to enable rotation of the rear wheel about the rear-wheel pivot as the suspension is working;
on the rear-wheel assembly and configured to enable rotation of the rear wheel about the chain-ring pivot as the suspension is working; and,
on the chain-ring assembly and configured to enable rotation of the rear wheel about the chain ring pivot as the suspension is working.

* * * * *